(12) United States Patent
Ikeda

(10) Patent No.: US 7,889,265 B2
(45) Date of Patent: Feb. 15, 2011

(54) IMAGING APPARATUS, CONTROL METHOD FOR THE IMAGING APPARATUS, AND STORAGE MEDIUM STORING COMPUTER PROGRAM WHICH CAUSES A COMPUTER TO EXECUTE THE CONTROL METHOD FOR THE IMAGING APPARATUS

(75) Inventor: Eiichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 11/465,196

(22) Filed: Aug. 17, 2006

(65) Prior Publication Data

US 2007/0052820 A1    Mar. 8, 2007

(30) Foreign Application Priority Data

Sep. 7, 2005    (JP) .............................. 2005-259459

(51) Int. Cl.
*G03B 13/00* (2006.01)
*H04N 5/225* (2006.01)

(52) U.S. Cl. .................................... 348/345; 348/220.1

(58) Field of Classification Search .............. 348/222.1, 348/345, 239, 349, 363, 362, 365, 346, 221.1; 382/199
See application file for complete search history.

(56) References Cited

U.S. PATENT DOCUMENTS

| | | | | |
|---|---|---|---|---|
| 6,727,948 B1 * | 4/2004 | Silverbrook | ................ | 348/345 |
| 7,298,412 B2 * | 11/2007 | Sannoh et al. | ............... | 348/348 |
| 7,573,505 B2 * | 8/2009 | Kawaguchi et al. | ...... | 348/222.1 |
| 2003/0071908 A1 * | 4/2003 | Sannoh et al. | ............... | 348/345 |
| 2004/0119851 A1 * | 6/2004 | Kaku | ......................... | 348/239 |
| 2005/0088538 A1 * | 4/2005 | Nozaki et al. | ............ | 348/229.1 |

FOREIGN PATENT DOCUMENTS

| | | |
|---|---|---|
| JP | 2002-251380 A | 9/2002 |
| JP | 2003-107335 A | 4/2003 |

* cited by examiner

*Primary Examiner*—David L Ometz
*Assistant Examiner*—Ahmed A Berhan
(74) *Attorney, Agent, or Firm*—Canon USA Inc IP Division

(57) ABSTRACT

A control method for an imaging apparatus includes photoelectrically converting a photographic subject image formed by an imaging optical system, repetitively detecting a photographic subject region based on a signal obtained from the photoelectric conversion applied to the photographic subject image, storing photographic subject information of the detected photographic subject region, acquiring the stored photographic subject information, reading, from the stored photographic subject information, photographic subject information corresponding to a point in time when an operation for reading the photographic subject information is performed, and setting an imaging parameter based on the read photographic subject information.

12 Claims, 13 Drawing Sheets

FIG.11

| FACE NO. | RELIABILITY | FACE COORDINATES | | | | SIZE | FACE CENTER COORDINATES | | DISTANCE FROM FACE CENTER |
|---|---|---|---|---|---|---|---|---|---|
| | | x0 | y0 | x1 | y2 | Area | x | y | Δcenter |
| 0 | 1 | 100 | 100 | 150 | 150 | 2500 | 125 | 125 | 35 |
| 1 | 3 | 50 | 50 | 90 | 90 | 1600 | 70 | 70 | 103 |
| 2 | 1 | 200 | 100 | 250 | 150 | 2500 | 225 | 125 | 65 |

FIG.12

| FACE NO. | AREA WEIGHTING (Wei1) 1/Area | DISTANCE WEIGHTING (Wei2) Δcenter | RELIABILITY (Wei3) | PRIORITY Wei1×Wei2×Wei3 |
|---|---|---|---|---|
| 0 | 0.0004 | 35 | 1 | 0.014 |
| 1 | 0.000625 | 103 | 3 | 0.193125 |
| 2 | 0.0004 | 65 | 1 | 0.026 |

FIG.13

| FACE DETECTION NO. | FACE RELIABILITY | FACE COORDINATES | | | | AREA | FACE CENTER COORDINATES | | Brightness |
|---|---|---|---|---|---|---|---|---|---|
| n | | x_ul[n] | y_ul[n] | x_dr[n] | y_dr[n] | Area[n] | x[n] | y[n] | B[n] |
| 0 | 1 | 100 | 100 | 150 | 150 | 2500 | 125 | 125 | 100 |
| 1 | 1 | 110 | 100 | 160 | 150 | 2500 | 135 | 125 | 102 |
| 2 | 1 | 150 | 120 | 200 | 170 | 2500 | 175 | 145 | 115 |
| 3 | 1 | 150 | 120 | 200 | 170 | 2500 | 175 | 145 | 116 |
| 4 | 1 | 155 | 125 | 205 | 175 | 2500 | 180 | 150 | 116 |

IMAGING APPARATUS, CONTROL METHOD FOR THE IMAGING APPARATUS, AND STORAGE MEDIUM STORING COMPUTER PROGRAM WHICH CAUSES A COMPUTER TO EXECUTE THE CONTROL METHOD FOR THE IMAGING APPARATUS

BACKGROUND OF THE INVENTION

1. Field of the Invention

The present invention relates to signal processing in an imaging apparatus, such as a digital camera and a video camera.

2. Description of the Related Art

Japanese Patent Application Laid-Open No. 2003-107335 discusses an imaging apparatus that can detect a human face from a captured image (generally referred to as a face detection technique). The imaging apparatus can perform focusing processing, exposure control, and color correction with respect to a detected face region.

FIG. 7 is a timing chart showing an image capturing operation performed by a conventional imaging apparatus with the face detection technique. FIG. 8 is a flowchart showing the image capturing operation performed by the conventional imaging apparatus.

When a shutter release button is half pressed (i.e., when a switch SW1 is pressed), the imaging apparatus periodically captures an image of a photographic subject to display the image of the subject on an electronic viewfinder (hereinafter, referred to as an EVF), and generates an image signal. According to the NTSC method, the image signal can be generally updated at intervals of 1/30 second. When a power source of the imaging apparatus is turned on, the imaging apparatus can execute an image capturing operation starting with step S801.

In step S801, when the shutter release button is half pressed by a user (i.e., when the switch SW1 is pressed), the imaging apparatus performs an image capturing operation to obtain an image for face detection (step S802). In step S803, the imaging apparatus performs conventional face detection processing applied to the image signal captured in step S802.

Then, in step S804, the imaging apparatus obtains face information including skin color and face contour. In step S805, the imaging apparatus sets a photometry frame and a range-finding frame. Then, in step S806, the imaging apparatus performs an automatic exposure (referred to as "AE") based on the information obtainable from the photometry frame set in step S805.

In step S807, the imaging apparatus performs automatic focusing (referred to as "AF") processing for adjusting the focus position on the AF frame set in step S805. After the AF processing of step S807 is accomplished, the imaging apparatus causes a lamp (not shown) equipped in the apparatus body to emit an in-focus sign (step S808).

In step S809, when the shutter release button is fully pressed by the user (i.e., when a switch SW2 is turned on), the imaging apparatus starts a shooting operation (step S810). In step S811, the imaging apparatus performs predetermined signal processing, including white balance ("WB") processing applied to a shot image including a human face being detected for optimizing color reproduction.

In step S812, the imaging apparatus converts an output signal in step S811 into a YUV signal. Then, the imaging apparatus compresses the YUV signal according to the JPEG compression method or a comparable compression method. In step S813, the imaging apparatus records the compressed signal into a CF (CompactFlash)® recording medium.

A conventional face detection module of an imaging apparatus includes the steps of scanning an image in response to turning-on of the switch SW1, performing face detection applied to the image, and then executing the AE and AF processing.

However, it is experimentally confirmed that a time required for the face detection module to detect a face is longer than the time required for the AF or AE processing even when a face detection algorithm is simplified.

Therefore, a shutter time lag (i.e., a time difference between ON timing of the switch SW1 and ON timing of the switch SW2) will be undesirably long.

SUMMARY OF THE INVENTION

The present invention is directed to a technique for mitigating the above-described problems.

Exemplary embodiments of the present invention are directed to a technique capable of reducing a shutter time lag by shortening a time required for photographic subject detection.

According to an aspect of the present invention, an imaging apparatus includes an imaging element, a photographic subject detecting unit, a storage unit, an information acquiring unit, and a setting unit. The imaging element can photoelectrically convert a photographic subject image formed by an imaging optical system. The photographic subject detecting unit can repetitively detect a photographic subject region based on a signal obtained from the imaging element. The storage unit can store photographic subject information of the photographic subject region detected by the photographic subject detecting unit. The information acquiring unit can obtain the photographic subject information stored in the storage unit. The setting unit can read, from the storage unit, photographic subject information corresponding to a point in time when an operation on the information acquiring unit is performed, and can set an imaging parameter based on the read photographic subject information.

According to another aspect of the present invention, a control method for an imaging apparatus includes: photoelectrically converting a photographic subject image formed by an imaging optical system; repetitively detecting a photographic subject region based on a signal obtained from the photoelectric conversion applied to the photographic subject image; storing photographic subject information of the detected photographic subject region; acquiring the stored photographic subject information; reading, from the stored photographic subject information, photographic subject information corresponding to a point in time when an operation for reading the photographic subject information is performed and setting an imaging parameter based on the read photographic subject information.

According to yet another aspect of the present invention, a computer-executable program includes program code for implementing the above-described control method for the imaging apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 11 is a view showing part of the result of a face information register detected by a face detection module.

FIG. 12 is a view showing a calculation result with respect to the priority.

FIG. 13 is a table showing an exemplary detection result obtained by the face detection module in accordance with the second exemplary embodiment.

DETAILED DESCRIPTION OF THE EMBODIMENTS

Figure 1:
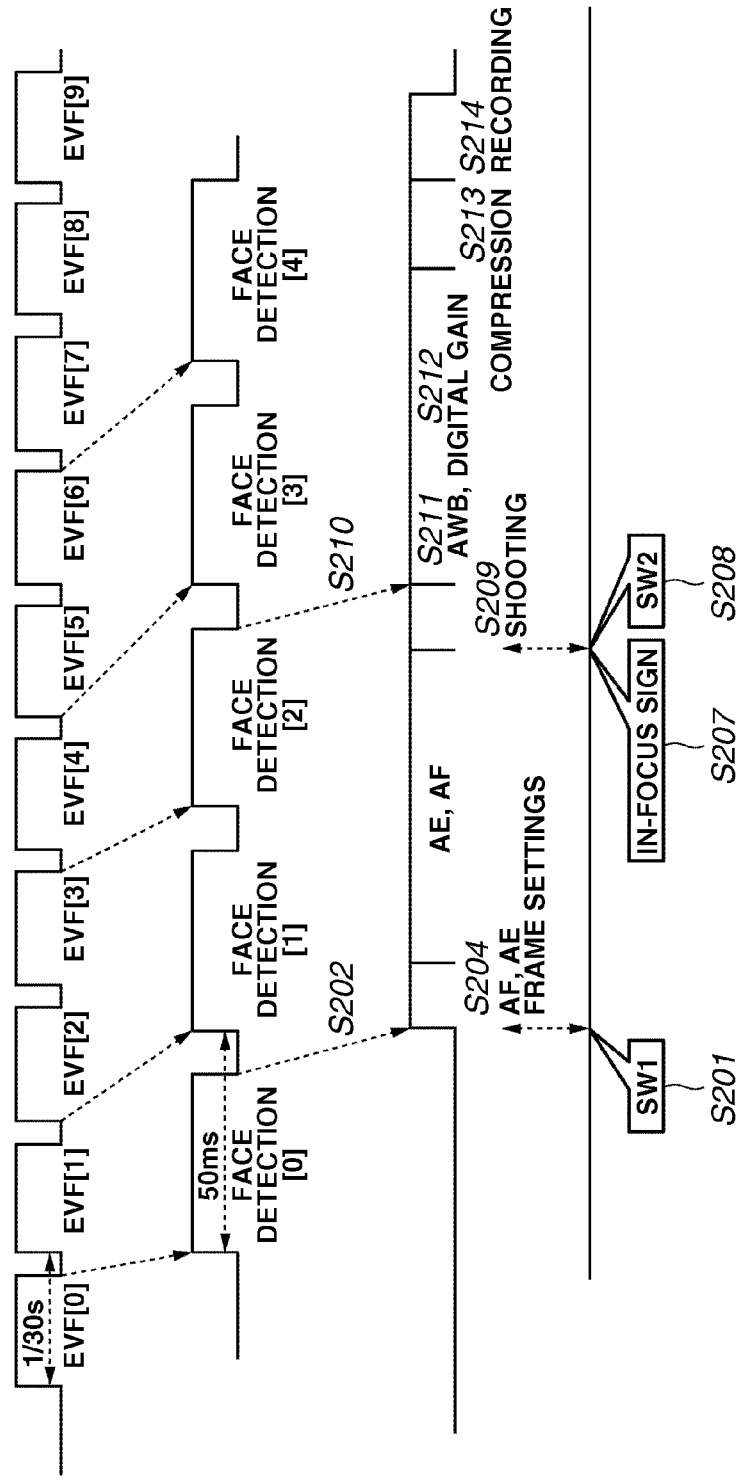
FIG. 1 is a timing chart showing an image capturing operation performed by an imaging apparatus in accordance with a first exemplary embodiment.

The following description of exemplary embodiments is illustrative in nature and is in no way intended to limit the invention, its application, or uses.

Processes, techniques, apparatus, and materials as known by one of ordinary skill in the art may not be discussed in detail but are intended to be part of the enabling description where appropriate.

For example, certain circuitry for signal processing, calculating, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is described with reference to one figure, it may not be discussed for following figures.

Exemplary embodiments will be described in detail below with reference to the drawings.

First Exemplary Embodiment

Figure 3:
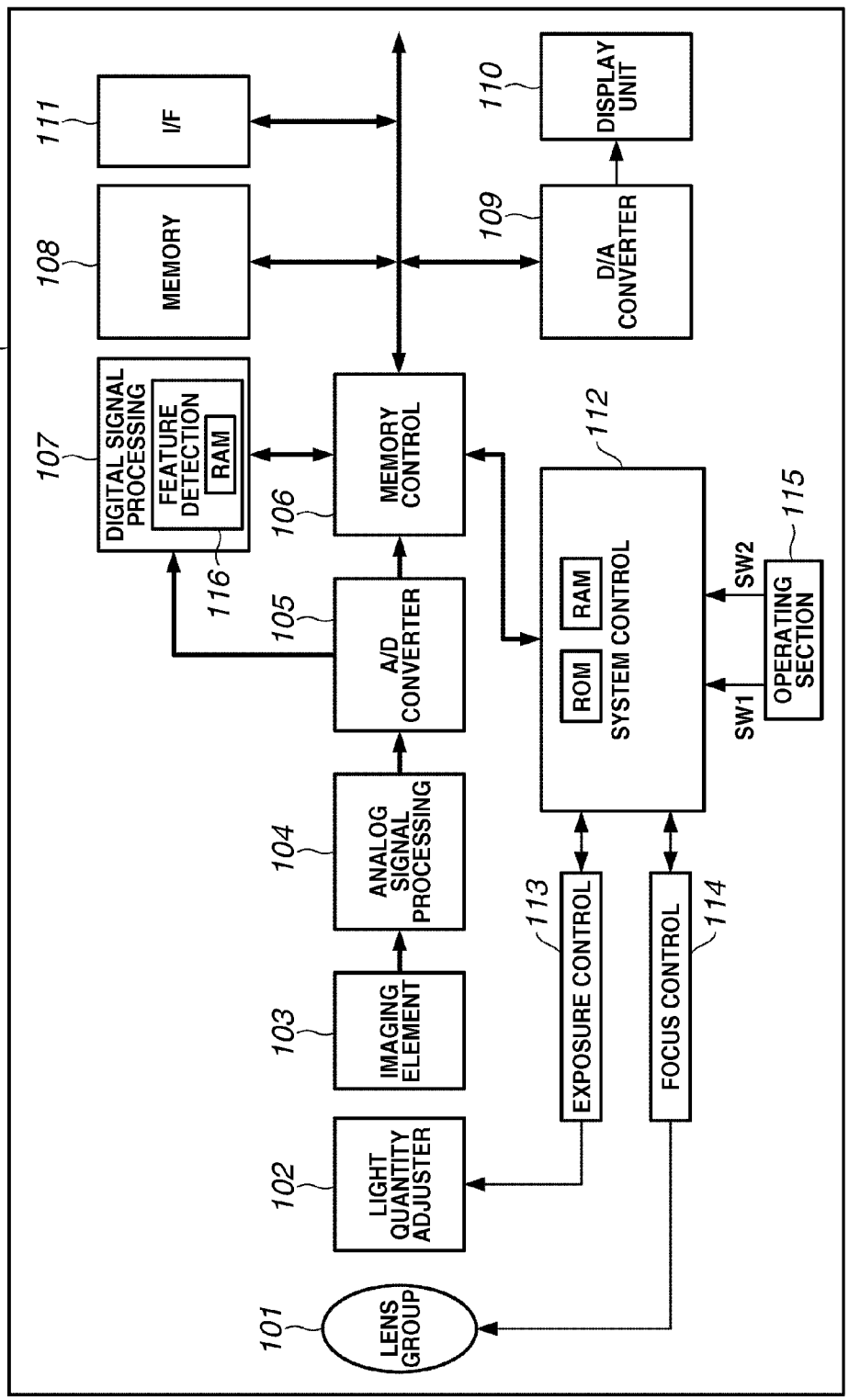
FIG. 3 is a block diagram showing an imaging apparatus in accordance with the first exemplary embodiment.

FIG. 3 is a block diagram showing an imaging apparatus 100 in accordance with the first exemplary embodiment of the present invention. In the present exemplary embodiment, the imaging apparatus 100 is an electronic still camera.

The imaging apparatus 100 includes an imaging lens group 101, a light quantity adjuster 102 including a diaphragm apparatus and a shutter apparatus, an imaging element 103 (e.g., a charge-coupled device (CCD) or complementary metal-oxide semiconductor (CMOS) sensor) that can convert light flux (i.e., photographic subject image) having passed through the imaging lens group 101 into an electric signal, and an analog signal processing circuit 104 that can perform clamp processing and gain processing applied to an analog signal produced from the imaging element 103.

Furthermore, the imaging apparatus 100 includes an analog/digital (hereinafter, referred to as A/D) converter 105 that can convert an output of the analog signal processing circuit 104 into a digital signal, a memory control circuit 106, and a digital signal processing circuit 107 that can perform pixel interpolation processing and color conversion processing applied to the data produced from the A/D converter 105 or to the data produced from the memory control circuit 106. The digital signal processing circuit 107 can also perform calculation based on captured image data.

Furthermore, the imaging apparatus 100 includes a system control circuit 112 that can control, based on calculation results obtained by the digital signal processing circuit 107, flash pre-emission (EF) processing and automatic exposure (AE) processing applied to an exposure control circuit 113, as well as a through-the-lens (TTL) type auto focus (AF) processing applied to a focus control circuit 114.

Furthermore, the digital signal processing circuit 107 can perform predetermined calculation processing applied to the captured image data, and execute a TTL-type automatic white balance (AWB) processing based on obtained calculation results.

Moreover, the digital signal processing circuit 107 includes a feature detection circuit 116. The feature detection circuit 116 can detect respective textures from frequency characteristics of an image signal with a band-pass filter (not shown), and can detect, from the detected textures, a candidate group of characteristic portions, such as eyes, a nose, a mouth, and ears, of a photographic subject.

Thus, the feature detection circuit 116 can detect a region where a main photographic subject is present. Furthermore, the feature detection circuit 116 includes a random access memory (RAM) that can store the detected feature information. Although the present exemplary embodiment uses the feature detection circuit 116, a conventionally known face detection technique can be used.

A neural network is a representative method for detecting a face region based on a learning technique. Furthermore, a template matching can be used to extract features representing eyes, a nose, a mouth or any other physical shape from an image region and to identify a face based on the similarity of the extracted features.

Furthermore, according to another conventional method, the quantity of features, such as a skin color or an eye shape, can be detected from an image and can be analyzed using a statistical method. In general, these conventional methods can be combined flexibly to optimize the face recognition. For example, as discussed in Japanese Patent Application Laid-Open No. 2002-251380, the face detection can be performed by using the wavelet transformation and the quantity of image features. The feature detection circuit 116 is not limited only to the face detection. The feature detection circuit 116 may detect features of the photographic subject other than the face.

The memory control circuit 106 can control the analog signal processing circuit 104, the A/D converter 105, the digital signal processing circuit 107, a memory 108, and a digital/analog (hereinafter, referred to as D/A) converter 109. The digital data produced from the A/D converter 105 can be written, via the digital signal processing circuit 107 and the memory control circuit 106, into the memory 108. Alternatively, the digital data produced from the A/D converter 105 can be written, via the memory control circuit 106, into the memory 108.

The memory 108 can store data to be displayed on a display unit 110. The data recorded in the memory 108 can be output, via the D/A converter 109, to the display unit 110 such as a thin film transistor (TFT) or a liquid crystal display (LCD) that can display an image based on the received data. Furthermore, the memory 108 can store captured still images and moving images, with a sufficient storage capacity for a predetermined number of still images and a predetermined time of moving images.

In other words, a user can shoot continuous still images or can shoot panoramic images, because the memory 108 enables writing large-sized image data at higher speeds. Furthermore, the memory 108 can be used as a work area of the system control circuit 112.

The display unit 110 can function as an EVF that successively displays captured image data. The display unit 110 can arbitrarily turn the display on or off in response to an instruction given from the system control circuit 112. When the display unit 110 is in an OFF state, the imaging apparatus 100 can reduce electric power consumption. Furthermore, the display unit 110 can display an operation state and a message with images and letters in accordance with the operation of the system control circuit 112 that can execute the programs.

An interface 111 can control communications between the imaging apparatus 100 and a storage medium (e.g., a memory card or a hard disk). The imaging apparatus 100 can transfer or receive image data and management information via the interface 111 to or from another computer or a peripheral device such as a printer.

When the interface 111 can operate in conformity with the protocol of a Personal Computer Memory Card International Association (PCMCIA) card (now also called a PC card) or a CompactFlash® card, various types of communication cards can be inserted into card slots of the interface 111. For example, the communication card can be selected from a local area network (LAN) card, a modem card, a universal serial bus (USB) card, an IEEE1394 card, a P1284 card, a Small Computer System Interface (SCSI) card, and a PHS card.

The system control circuit 112 can control the operation of the imaging apparatus 100. The system control circuit 112 includes a RAM that can store imaging parameters and control variables, and a read-only memory (ROM) that can store program code for implementing the present exemplary embodiment.

The exposure control circuit 113 can control the diaphragm apparatus and the shutter apparatus equipped in the light quantity adjuster 102. The focus control circuit 114 can control a focusing action and a zooming action of the imaging lens group 101. The exposure control circuit 113 and the focus control circuit 114 can be controlled according to the TTL-method. The system control circuit 112 controls the exposure control circuit 113 and the focus control circuit 114, based on calculation results obtained from the digital signal processing circuit 107 that performs calculation based on the captured image data.

An operating section 115 includes switches SW1 and SW2 that can instruct the shooting timing to the imaging apparatus 100. When a shutter release button (not shown) is half pressed, the switch SW1 is turned on. When the shutter release button is fully pressed, the switch SW2 is turned on. The imaging apparatus 100 performs focus adjustment and photometry processing in response to an ON signal of the switch SW1 and starts a shooting operation in response to an ON signal of the switch SW2.

Figure 4A:
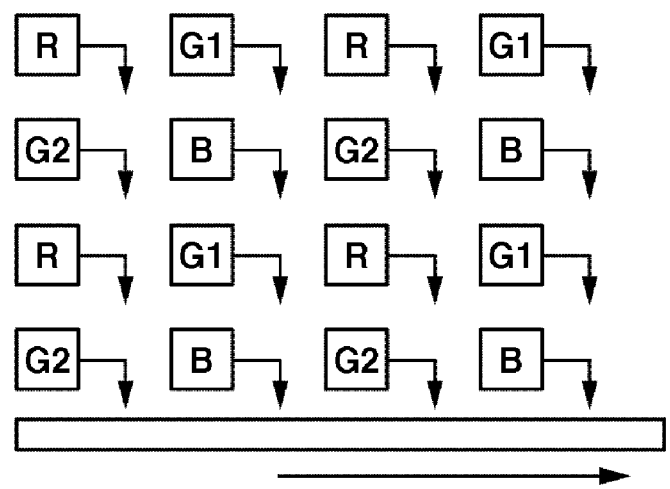
FIGS. 4A and 4B are views showing an ordinary signal reading operation.

An ordinary signal reading operation will be described below with reference to FIGS. 4A and 4B.

The imaging element 103 can generate a captured image signal at intervals of 1/30 second, according to an adding or thinning mode, and can transfer the captured image signal to a signal processing section of the camera. In the present exemplary embodiment, the imaging element 103 can operate according to an ordinary still image reading mode (i.e., an entire pixel reading mode) as shown in FIG. 4A.

Figure 4B:
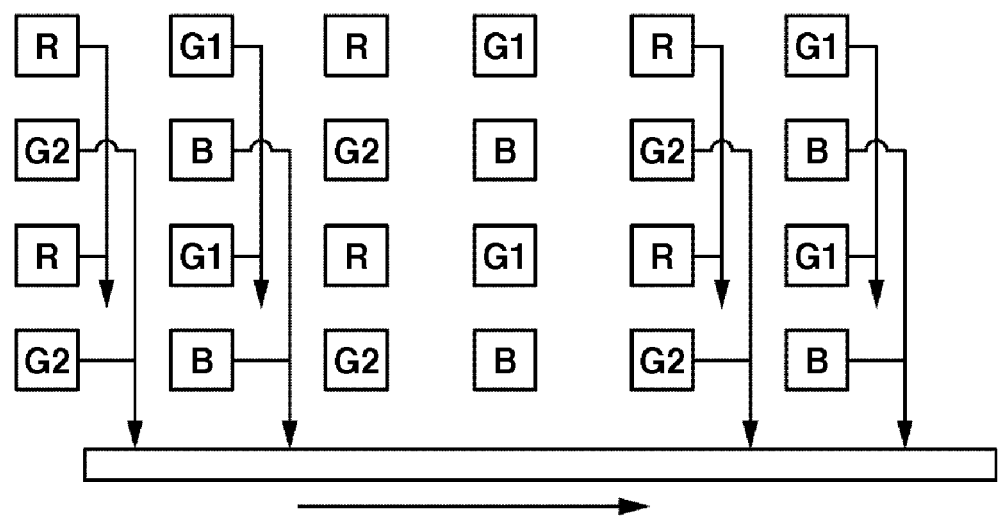

Furthermore, in addition to the above-described reading method, the imaging element 103 can operate according to a movie reading mode (i.e., a reading mode including addition of 2 pixels vertically aligned and having the same color and thinning of 2 pixels horizontally aligned) as shown in FIG. 4B. The imaging element 103 can operate in the movie reading mode for causing the display unit 110 to display still images or moving images.

To display an image on the display unit 110, it is necessary to speedily read electric charge. Hence, the adding and thinning mode shown in FIG. 4B can be used to activate the imaging element. However, there are many types of adding and thinning modes other than the example shown in FIG. 4B, although the difference in the modes is not essential to the present invention.

Next, an image capturing operation performed by the imaging apparatus 100 according to the present exemplary embodiment will be described with reference to the flowchart shown in FIG. 2 as well as the timing chart shown in FIG. 1.

Figure 2:
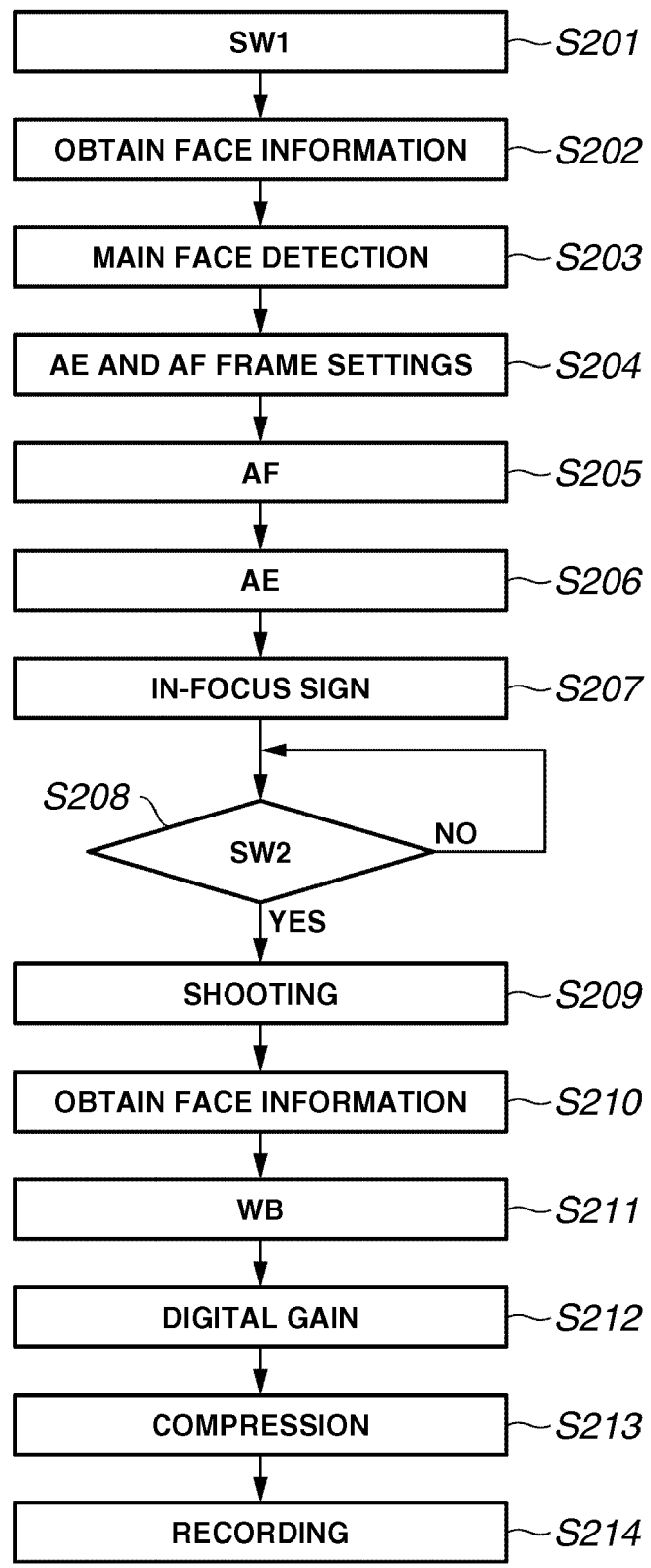
FIG. 2 is a flowchart showing an image capturing operation performed by the imaging apparatus in accordance with the first exemplary embodiment.

When a power source of the imaging apparatus 100 is turned on, the imaging apparatus 100 can execute the image capturing operation starting with step S201 of FIG. 2.

When the shutter release button is half pressed by a user (i.e., when the switch SW1 is turned on) in step S201, the processing flow proceeds to step S202, where the system control circuit 112 reads the latest face information at that point of time from the feature detection circuit 116.

The switch SW1 can function not only as a unit for triggering the AF and AE processing for a shooting operation but also can function as a unit for reading face information relating to face detection.

According to a camera action sequence of the present exemplary embodiment, first executing the face detection processing is not after ON timing of the switch SW1.

The imaging apparatus 100 continuously executes face detection based on image signals produced for the display unit 110 when the display unit 110 performs a framing action before ON timing of the switch SW1.

Then, the imaging apparatus 100 writes face information into the RAM of the feature detection circuit 116, and updates the information.

Then, at ON timing of the switch SW1, the imaging apparatus 100 reads the latest face detection result (i.e., face information) stored in the RAM of the feature detection circuit 116.

With this operation, it is unnecessary to perform the face detection for the AE and AF processing after ON timing of the switch SW1. Therefore, the time lag between the ON timing of the switch SW1 and the display of in-focus sign can be reduced.

In the present exemplary embodiment, the face information includes characteristic features of a face, such as skin color, face contour, as well as eye shape, nose shape, and mouth shape.

According to the camera action sequence of FIG. 1, an image signal to be displayed on the display unit 110 can be captured, processed, and output at intervals of 1/30 second (refer to EVF[0], EVF[1], - - -, EVF[9], - - -).

On the other hand, the feature detection circuit 116 executes the face detection based on the image signal presently used for the display unit 110 at predetermined timing (e.g., at intervals of 50 msec), regardless of the display period (update of image) of the display unit 110.

FIG. 1 shows face detection [0], face detection [1], . . . , face detection [4], . . . , resulting from the processing of the feature detection circuit 116.

For example, according to the example of FIG. 1, the face information having been read at the ON timing of the switch SW1 is the result of face detection [0] obtained based on the image signal EVF[0].

In step S203, the imaging apparatus 100 performs detection of a main face if there are two or more detected faces. To this end, the imaging apparatus 100 gives priority to each of the detected faces considering the size of a face, the distance from the center, and information relating to reliability.

Regarding the method for calculating a priority factor allocated to each detected face, the imaging apparatus 100 can perform weighting with reference to the size of a face, coordinate data, and reliability information involved in the detected face information.

The feature detection circuit 116 performs face detection applied to a photographic subject involved in an image to be displayed on the display unit 110.

FIG. 11 shows part of the detected result.

FIG. 12 is a view showing a calculation result with respect to the priority.

More specifically, the priority factor can be calculated by multiplying an area weighting factor, a distance weighting factor, and a reliability factor (i.e., factors allocated to the size of a face, the coordinate data, and the reliability information).

When the size of a face is large, the area weighting factor is small. When the detected face is close to the center position, the distance weighting factor is small. When the reliability is high, the reliability factor is small.

The reliability can be determined considering the degree of matching with respect to candidate groups of face characteristic portions, e.g., eyes, nose, mouth, and ears. In this case, when the priority factor is small, the priority is high.

In the present exemplary embodiment, it is possible to determine the priority factor by further multiplying other factors with the above-described factors.

Next, in step S204, the system control circuit 112 sets weighting factors for the AF and AE frames, so that the coordinate data of a highest priority face calculated in step S203 has a largest weighting factor.

In step S205, the focus control circuit 114 performs AF processing based on the AF frame set in step S204.

In step S206, the exposure control circuit 113 performs AE processing based on the weighting factor set in step S204.

In step S207, the system control circuit 112 confirms accomplishment of the AF and AE processing and causes a lamp (not shown) equipped in the camera body to emit an in-focus sign.

In step S208, it is determined whether a user has fully pressed the shutter release button (i.e., whether the switch SW2 is turned on).

When the shutter release button is fully pressed by the user in step S208, the processing proceeds to step S209, where the system control circuit 112 performs shooting of a still image with the settings of a shutter speed (Tv), an aperture value (Av), and an in-focus position. When the shooting operation is accomplished, an output signal of the imaging element 103 is once stored in the memory 108 of the camera and then sent to the D/A converter 109.

When the shutter release button is not fully pressed by the user in step S208, the processing of step S208 is repetitively performed.

The camera action sequence of the present exemplary embodiment can reduce or minimize the shutter time lag resulting from the face detection processing which is required to performed during a time interval between the ON timing of the switch SW1 and the ON timing of the switch SW2.

The camera action sequence of the present exemplary embodiment can periodically perform the face detection applied to the image presently displayed on the display unit 110.

Then, the camera action sequence of the present exemplary embodiment performs the AF and AE processing based on the face detection information present at the ON timing of the switch SW1.

Figure 7:
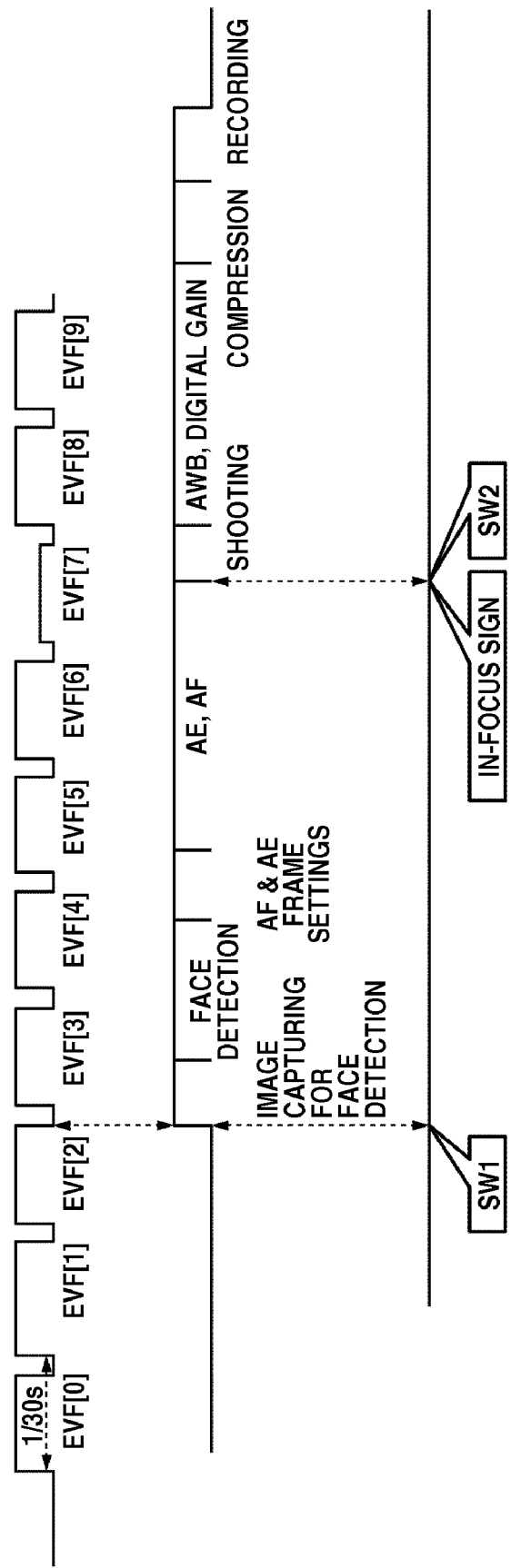
FIG. 7 is a timing chart showing an image capturing operation performed by a conventional imaging apparatus.
Figure 8:
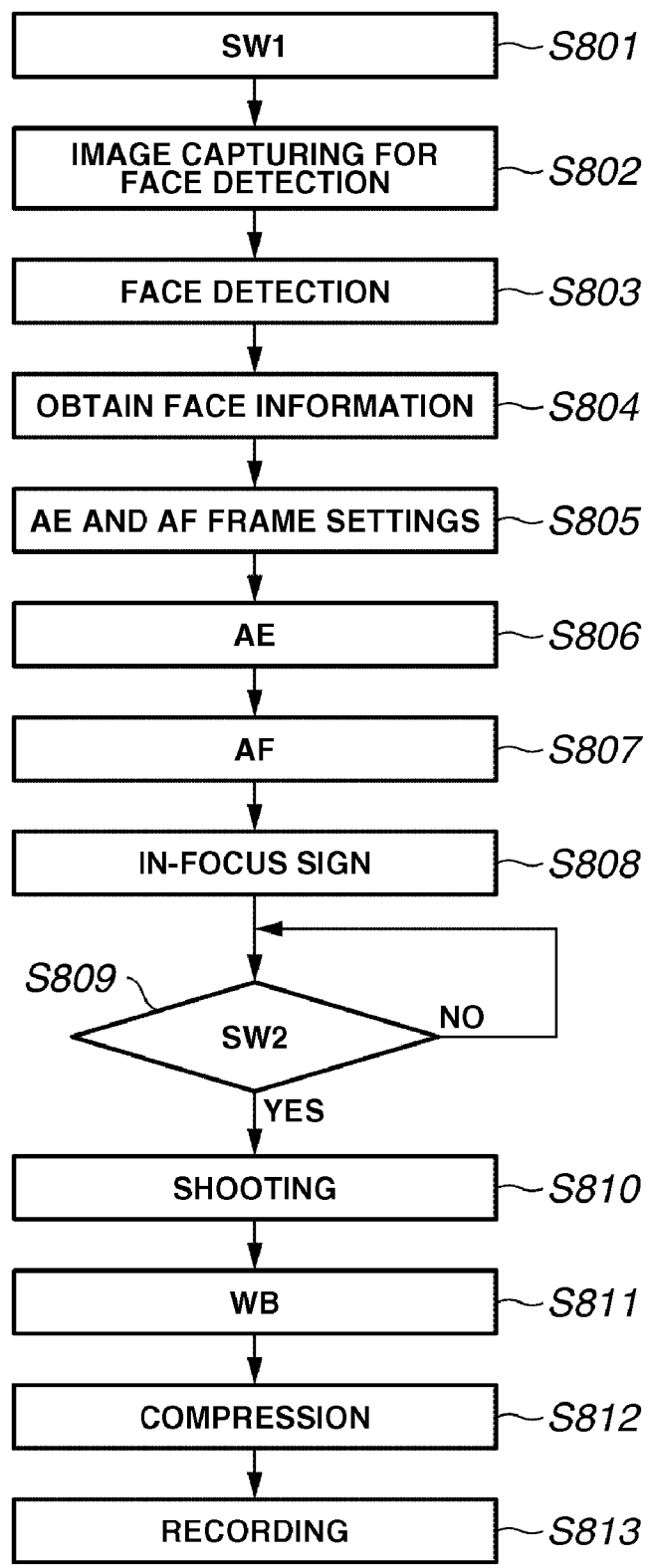
FIG. 8 is a flowchart showing the image capturing operation performed by the conventional imaging apparatus.

The shooting operation according to the present exemplary embodiment (refer to FIG. 1) is different from the conventional shooting operation shown in FIG. 7.

At the timing of the switch SW1, the imaging apparatus 100 executes the AE and AF processing based on the information of face detection [0] obtained from the image signal EVF[0].

After accomplishing the shooting operation, the imaging apparatus 100 executes the AWB processing and the digital gain processing based on the information of face detection [2] obtained from the image signal EVF[3].

As a result, compared to the convention processing shown in FIG. 7, the present exemplary embodiment can reduce the shutter time lag by an amount equivalent to a time required for "the image capturing processing for obtaining an image used in the face detection+the face detection processing."

Next, in step S210, the system control circuit 112 obtains the latest face information from the RAM of the feature detection circuit 116.

The time lag caused by the face detection processing and the AF and AE processing may differentiate the face position of an image being read in step S201 from the face position of an image obtained in step S209, if a photographic subject moves. Therefore, the system control circuit 112 again obtains the face information.

Accordingly, the latest face detection information obtained at the ON timing of the switch SW2 can be used for the succeeding signal processing.

In step S211, the digital signal processing circuit 107 performs optimized WB processing based on the face information obtained in step S210. A conventional method can be used to perform the WB processing based on the information obtained by the face detection.

For example, there is a conventional method capable of removing a detected face region from the white detection range to improve the accuracy in the white detection.

Another conventional method includes the steps of executing skin color detection processing applied to a detected face region, predicting a color temperature of a light source based on the skin color, and calculating a color temperature of the environment light.

In step S212, the digital signal processing circuit 107 performs digital gain correction to optimize the brightness of a detected face region and then performs image correction.

A correction value for the digital gain correction can be calculated in the following manner.

First, the digital signal processing circuit 107 calculates a brightness average value (FaseYave) of the detected face region and calculates a correction gain value (Fk).

$$Fk=200/\text{FaseYave}$$

where the range of the correction gain value is set to $$1.0 \leq Fk \leq 1.25.$$

If the correction gain value (Fk) is equal to or less than 1.0, a maximum value of the corrected image signal will be equal to or less than 1024 (in the case of 10-bit RAW) and the Y signal obtained after gamma correction will be less than 255. Therefore, the RGB ratio of the saturation region will deteriorate and an inherent color cannot be reproduced. Furthermore, when the correction gain value (Fk) is equal to or greater than 1.25, the signal-to-noise (S/N) ratio will attenuate.

In step S213, the digital signal processing circuit 107 compresses the digital gain corrected image signal according to the JPEG compression method or a comparable compression method. In step S214, the image signal generated in step S213 is recorded in the memory 108.

As described above, the present exemplary embodiment can decrease the release time lag by omitting the image capturing operation for the face detection after the ON timing of the switch SW1.

The present exemplary embodiment uses the position of a detected face region in both the AF processing and the AE processing. However, the position of a detected face region can be used for only one of the AF and the AE processing.

Furthermore, the present exemplary embodiment can use the latest face detection information obtained at the ON timing of the switch SW2 to execute the signal processing required after the ON timing of the switch SW2. Therefore, even when a photographic subject moves, the present exemplary embodiment can accurately perform the WB processing considering the present position of the face region.

The present exemplary embodiment updates an image displayed on the display unit 110 at intervals of 1/30 second and executes the face detection at intervals of 50 msec. However, the processing time can be changed appropriately.

Second Exemplary Embodiment

Compared to the first exemplary embodiment, the second exemplary embodiment is characterized in that the cycle of the face detection performed before the ON timing of the switch SW1 is different from the cycle of the face detection performed between the ON timing of the switch SW1 and the ON timing of the switch SW2.

According to the above-described operation, the cycle of the face detection performed during the display period of the display unit 110 before the ON timing of the switch SW1 can be set to be slower compared to the cycle of the face detection performed after the ON timing of the switch SW1. As a result, the second exemplary embodiment can decrease the total number of required face detections. Thus, the second exemplary embodiment can decrease the power consumption caused by the face detection.

Furthermore, shortening the cycle of the face detection in a shooting operation after the ON timing of the switch SW1 can optimize the image capturing operation applied to the face region detected using the method of the first exemplary embodiment. According to the second exemplary embodiment, in an ordinary operation of the display unit 110 before the ON timing of the switch SW1, for example, the face detection is performed at intervals of 100 ms (ΔFD1), as illustrated in the operation timing chart of FIG. 5.

Similar to the first exemplary embodiment, the feature detection circuit 116 performs face detection based on an EVF image EVF[0] obtained at the timing of face detection [0].

Furthermore, when the display unit 110 performs a framing action for capturing a shooting scene, the second exemplary embodiment performs the optimized AE, AF, and WB processing applied to a detected face at preset intervals.

With this operation, the AE, AF, and WB processing can be continuously locked for the detected face. A method similar to that described in the first exemplary embodiment can be used to implement the AE, AF, and WB processing based on the face information.

However, frequently switching the AE, AF, and WB processing during the operation of the display unit 110 will cause flickering of a screen image due to changes in the shooting conditions.

Hence, the second exemplary embodiment checks any change occurring in a detected face, such as position change, brightness change, and area change, with reference to face information detected during the operation of the display unit 110.

The second exemplary embodiment regards a small change less than a predetermined threshold as "no change in the scene" and does not execute the AE, AF, and WB processing.

FIG. 13 shows an exemplary detection result obtained by the face detection circuit 116 in accordance with the second exemplary embodiment.

Figure 5:
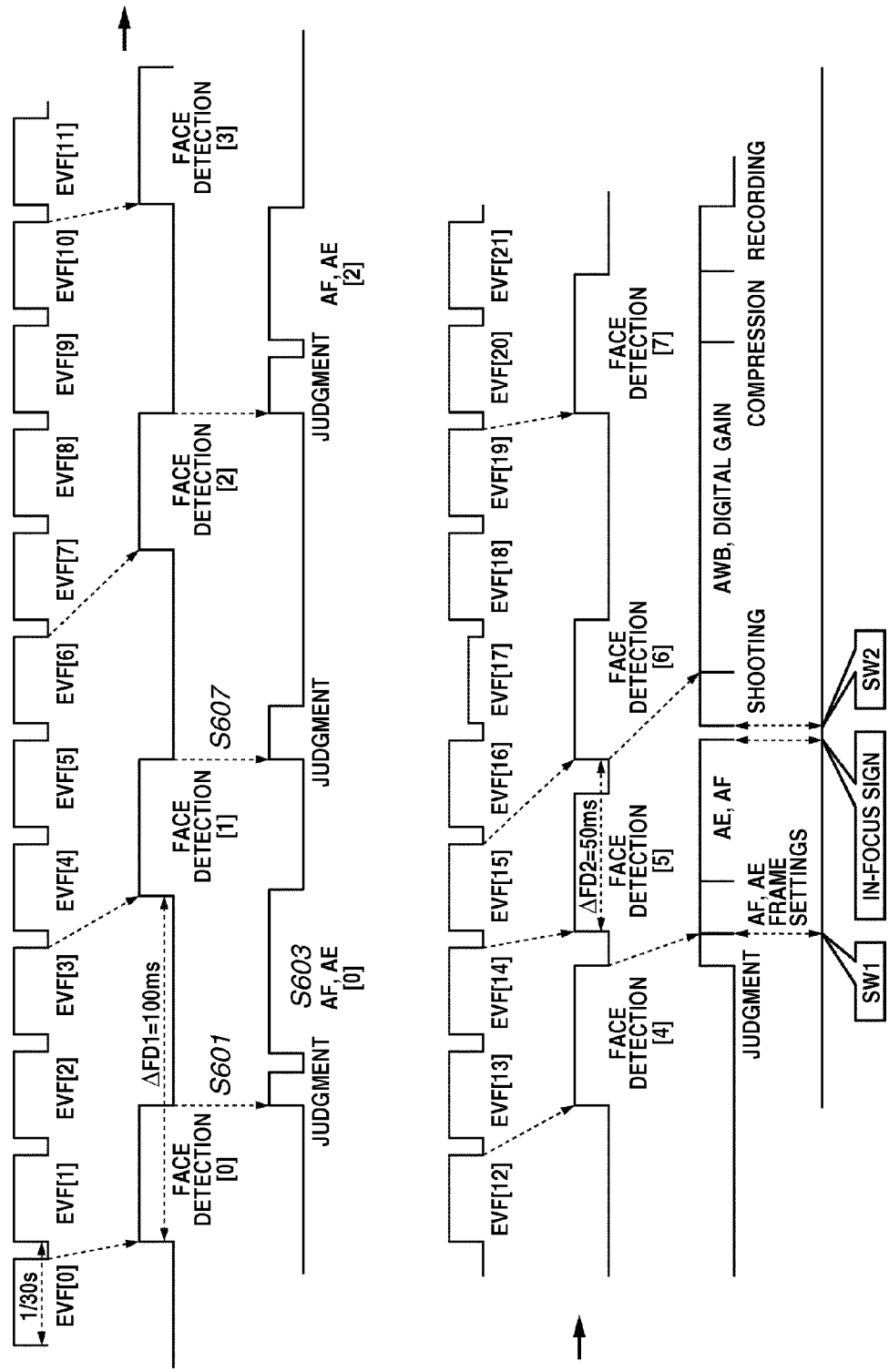
FIG. 5 is a timing chart showing an image capturing operation performed by the imaging apparatus in accordance with a second exemplary embodiment.
Figure 6:
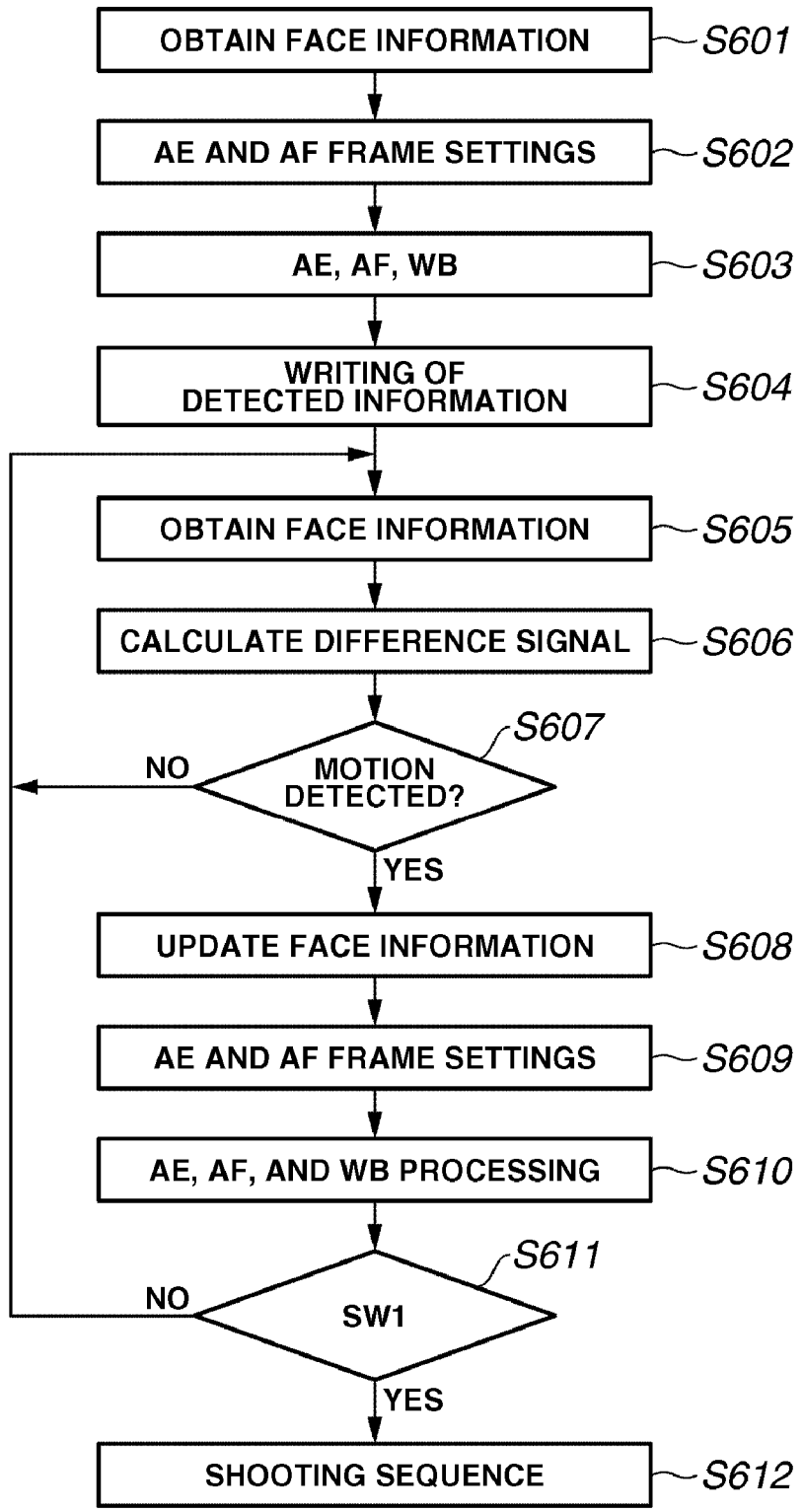
FIG. 6 is a flowchart showing an image capturing operation performed by the imaging apparatus in accordance with the second exemplary embodiment.

An operation of the imaging apparatus 100 according to the second exemplary embodiment will be described below with reference to the detection result obtained by the feature detection circuit 116 shown in FIG. 13, the operation timing shown in FIG. 5, and the processing flow shown in FIG. 6.

The imaging apparatus 100 can perform an image capturing operation starting with step S601 in an ON state of the face detection function during the display period of the display unit 110.

In step S601, the system control circuit 112 obtains face information from the face detection [0]. If a power source switch is turned on, the imaging apparatus 100 starts the shooting processing to perform the first face detection.

In step S602, the system control circuit 112 sets the AE and AF frames based on the face information obtained in step S601.

In step S603, based on the AE and AF frames set in step S602, the focus control circuit 114 performs the AF processing, the exposure control circuit 113 performs the AE processing, and the digital signal processing circuit 107 performs the WB processing.

In step S604, the memory control circuit 106 writes the information detected from the face detection [0] into the RAM of the feature detection circuit 116.

In step S605, the feature detection circuit 116 performs face detection [1] based on an image signal EVF[3], and the system control circuit 112 obtains face information from the result of face detection [1].

In step S606, the system control circuit 112 calculates a difference signal representing a difference between the face information obtained in step S605 and the information written in step S604 (i.e., the information detected from the face detection [0] stored in the RAM of the feature detection circuit 116).

The difference signal calculated in step S606 is the information representing the motion of a photographic subject.

The second exemplary embodiment obtains the motion information using the following method.

When "Δpos" represents the position change, "ΔBrightness" represents the brightness change, and "Δarea" represents the area change, the motion information of the photographic subject can be expressed with the following equations.

$$\Delta pos = \sqrt{(x[1] - \text{Pre\_x})^2 + (y[1] - \text{Pre\_y})^2}$$
$$= \sqrt{(135 - 125)^2 + (125 - 125)^2}$$
$$= 10$$

ΔBrightness=B[1]−pre_B=102−100=2

Δarea=Area[1]−pre_Area=2500−2500=0

For example, when a position change threshold is 50, a brightness change threshold is 10, and an area change threshold is 20, Δpos<50

ΔBrightness<10

Δarea<20

Therefore, in step S607, the system control circuit 112 determines that the photographic subject is not moving. Thus, the processing flow returns to step S605. When the photographic subject is not moving, the imaging apparatus 100 does not execute the AE and AF processing.

When the AE and AF processing is not executed, the face information obtained from the face detection [0] is continuously held.

Next, in step S605, the feature detection circuit 116 performs face detection [2] based on an image signal EVF[6], and the system control circuit 112 obtains face information from the result of face detection [2].

In step S606, the system control circuit 112 calculates a difference signal representing a difference between the face information obtained from the result of the face detection [2] and the information written in step S604 (i.e., the information detected from the face detection [0] stored in the RAM of the feature detection circuit 116).

$$\Delta pos = \sqrt{(x[2] - \text{Pre\_x})^2 + (y[2] - \text{Pre\_y})^2}$$
$$= \sqrt{(175 - 125)^2 + (145 - 125)^2}$$
$$= 53.85$$

ΔBrightness=B[2]−pre_B=115−100=15

Δarea=Area[2]−pre_Area=2500−2500=0

When the above-described thresholds are used,

Δpos>50

ΔBrightness>10

Δarea<20

Accordingly, the position change is greater than the threshold, and the brightness change is greater than the threshold.

Based on the above, in step S607, the system control circuit 112 determines that the photographic subject is moving. Then, the processing flow proceeds to step 608.

In step S608, the memory control circuit 106 updates (i.e., replaces) the information stored in the RAM of the feature detection circuit 116 with the face information obtained from the face detection [2].

In step S609, the system control circuit 112 sets the AE and AF frames based on the face information updated in step S608.

In step S610, based on the AE and AF frames set in step S609, the focus control circuit 114 performs the AF processing and the exposure control circuit 113 performs the AE processing.

In step S611, when the switch SW1 is turned on by the user, the processing flow proceeds to step S612. When the switch SW1 is not yet turned on, the system control circuit 112 repeats the processing of step S605 through step S611 until the switch SW1 is turned on.

In step S612, the second exemplary embodiment executes the processing of step S202 through step S214 of FIG. 2 described in the first exemplary embodiment.

As described above, the present exemplary embodiment can set the cycle of the face detection performed after the ON timing of the switch SW1 to be shorter than the cycle of the face detection performed before the ON timing of the switch SW1.

Therefore, the present exemplary embodiment can improve the control accuracy so as to quickly respond to the movement of a photographic subject after the ON timing of the switch SW1 compared to the control accuracy before the ON timing of the switch SW1. Thus, the present exemplary embodiment can accurately follow up a photographic subject.

Furthermore, the present exemplary embodiment performs the AE and AF processing after the ON timing of the switch SW1 regardless of the movement of the photographic subject. Thus, the present exemplary embodiment can improve the accuracy of the AE and AF processing.

As described above, according to the second exemplary embodiment, the cycle of the face detection performed during the EVF display period before the ON timing of the switch SW1 can be set to be slower compared to the cycle of the face detection performed after the ON timing of the switch SW1. As a result, the second exemplary embodiment can decrease the total number of required face detections. Thus, the second exemplary embodiment can decrease the power consumption caused by the face detection.

Third Exemplary Embodiment

The third exemplary embodiment is characterized by calculating a time difference ΔT between the shooting timing of an EVF image used for calculating the latest face information at the ON timing of the switch SW1 and the ON timing of the switch SW1. When the time difference ΔT is shorter than a preset time, the third exemplary embodiment performs the imaging signal processing similar to that of the first exemplary embodiment.

When the time difference ΔT is long than the preset time, there is a possibility of scene change. Therefore, the third exemplary embodiment performs the face detection after the ON timing of the switch SW1, and then performs the imaging signal processing based on the detection result.

An image capturing operation of the imaging apparatus 100 according to the third embodiment will be described below with reference to the flowchart shown in FIG. 10.

Figure 9:
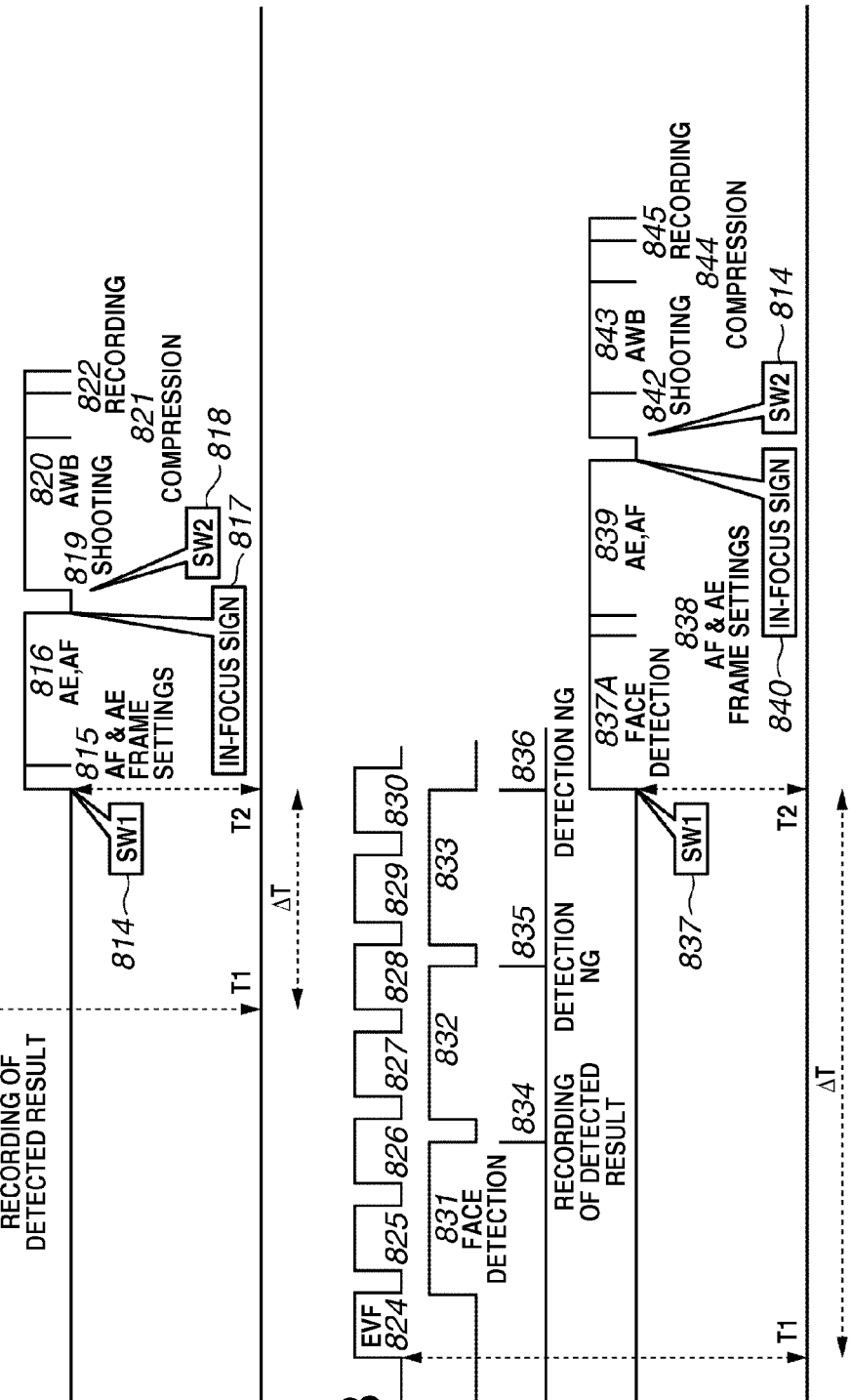
FIGS. 9A and 9B are timing charts showing an image capturing operation performed by the imaging apparatus in accordance with a third exemplary embodiment.

FIGS. 9A and 9B show the operation timing of the imaging apparatus 100.

Figure 10:
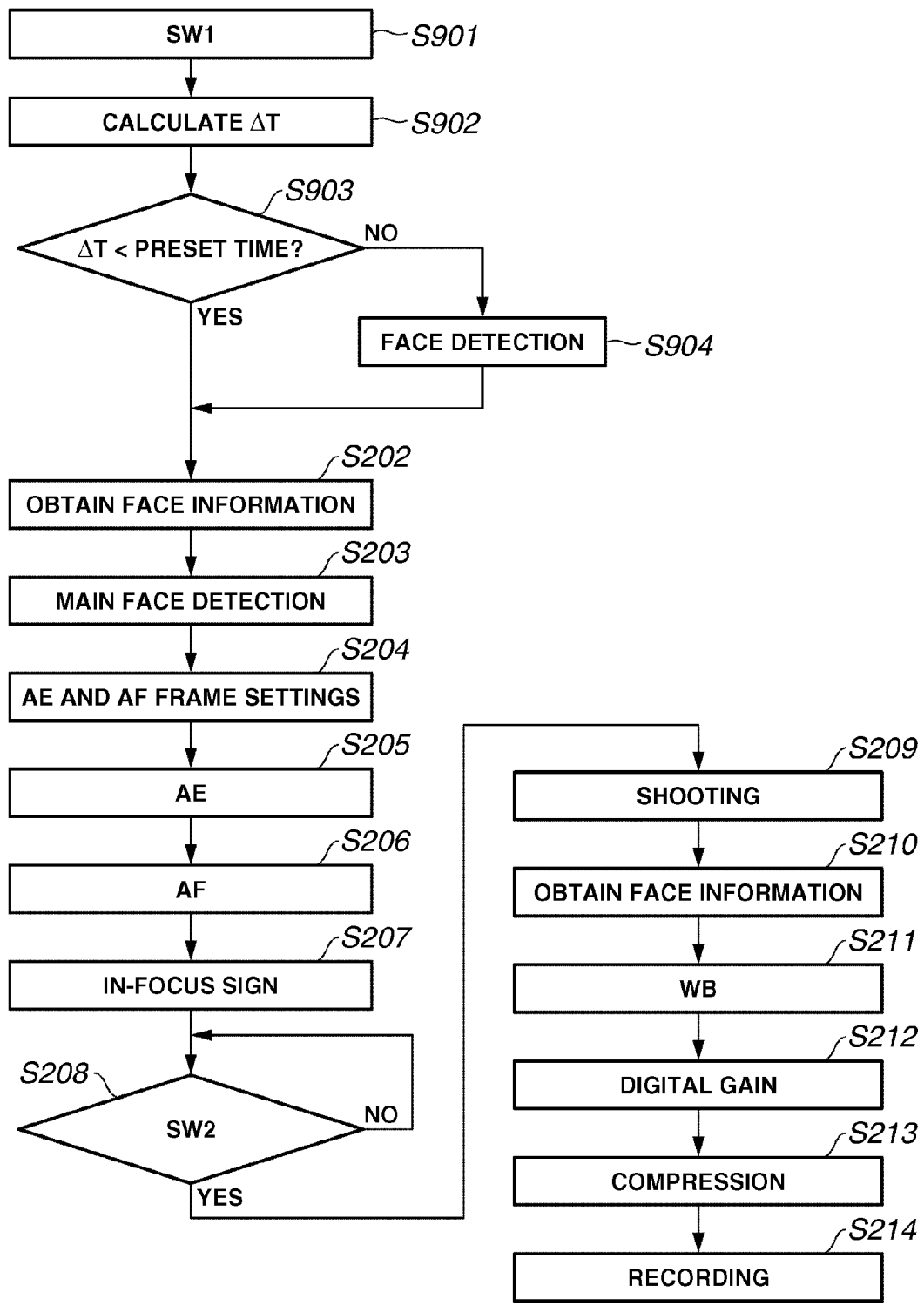
FIG. 10 is a flowchart showing an image capturing operation performed by the imaging apparatus in accordance with the third exemplary embodiment.

In the flowchart shown in FIG. 10, the processing of step S202 through step S214 is similar to the processing of FIG. 2 described in the first exemplary embodiment, and the description thereof will not be repeated.

When the power source of the imaging apparatus 100 is turned on, the imaging apparatus 100 can execute an image capturing operation starting with step S901.

When the switch SW1 of the shutter release button is turned on by the user in step S901, the processing flow proceeds to step S902.

In step S902, the system control circuit 112 reads shooting timing T1 of an EVF image used for detecting the latest face information at that timing from the RAM of the feature detection circuit 116.

Then, the system control circuit 112 calculates a difference time $\Delta T$ between the shooting timing T1 and the ON timing T2 of the switch SW1. When the latest face detection is successful as shown in FIG. 9A, the EVF image used for calculating the face information 813 at the ON timing of the switch SW1 is an image EVF805.

Furthermore, when the latest face detection is unsuccessful as shown in FIG. 9B, the latest face information at the ON timing of the switch SW1 is the face information 834. The EVF image used for calculating the face information is an image EVF824. FIG. 9B shows a thus-obtained time difference $\Delta T$.

In step S903, the system control circuit 112 compares the calculated time difference $\Delta T$ with a preset time. When the time difference $\Delta T$ is equal to or greater than the preset time, the processing proceeds to step S904. When the time difference $\Delta T$ is less than the preset time, the processing flow proceeds to step S202.

In step S904, the system control circuit 112 performs face detection based on the latest EVF image 829 obtained at the ON timing of the SW1.

If the system control circuit 112 fails in the face detection in the step S904, the system control circuit 112 sets the AE and AF frames in an ordinary region and performs a shooting operation in the succeeding processing.

As described above, the third exemplary embodiment calculates a time difference between the shooting timing of an EVF image used for obtaining the latest face detection result at the ON timing of the switch SW1 and the ON timing of the switch SW1. Then, the third exemplary embodiment determines whether to newly execute the face detection after the ON timing of the switch SW1.

Therefore, the third exemplary embodiment newly executes face detection in such a case that the face detection has continuously failed before the ON timing of the switch SW1 because of, for example, a photographic subject being moving. Thus, the third exemplary embodiment can accurately perform the AE and AF processing.

Other Embodiments

Software program code for realizing the functions of the above-described exemplary embodiments can be supplied, via a storage medium (or a recording medium), to a system or an apparatus. A computer (or central processing unit (CPU) or micro-processing unit (MPU)) in the system or the apparatus can read the program code stored in the storage medium and can execute the above-described processing applied to an imaging apparatus which is remote controllable.

In this case, the program code read out from the storage medium can realize the functions of the exemplary embodiments. The equivalents of program code can be used if they possess comparable functions.

Furthermore, not only the functions of the above-described exemplary embodiment can be realized by a computer that executes the program code, but also an operating system (OS) running on the computer can execute part or all of the actual processing based on instructions of the program code.

In this case, a recording medium supplying the program code can be selected from any one of a flexible disk, a hard disk, an optical disk, a magneto-optical disk (MO), a compact disk-ROM (CD-ROM), a CD-recordable (CD-R), a CD-rewritable (CD-RW), a magnetic tape, a nonvolatile memory card, a ROM, and a digital versatile disk (DVD) (DVD-ROM, DVD-R). Furthermore, various communication networks, such as LAN and wide area network (WAN), can be used to supply the program code.

More specifically, the method for supplying the program code can include accessing a home page on the Internet using the browsing function of a client computer, when the home page allows each user to download the program code, or compressed files of the program code having automatic installing functions, to a hard disk or another recording medium of the user.

For example, the program code can be divided into a plurality of files so that respective files are downloadable from different home pages. Namely, the present invention encompasses World Wide Web (WWW) servers that allow numerous users to download the program files so that the functions or processes of the present invention can be realized on their computers.

Furthermore, enciphering the programs of the present invention and storing the enciphered programs on a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, the program code read out of a storage medium can be written to a memory of a function expansion board equipped in a computer or to a memory of a function expansion unit connected to the computer. In this case, based on an instruction of the program, a CPU provided on the function expansion board or the function expansion unit can execute part or all of the processing so that the functions of the above-described exemplary embodiments can be realized.

When the present invention is applied to the above-described recording medium, the recording medium stores the program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-259459 filed Sep. 7, 2005, which is hereby incorporated by reference herein in its entirety.

What is claimed is:

1. An imaging apparatus comprising:
   an imaging element that photoelectrically converts a photographic subject image formed by an imaging optical system;

a face region detecting unit that repetitively detects a face region based on a signal obtained from the imaging element;

a storage unit that stores coordinate data of the face region detected by the face region detecting unit;

a focus control unit that reads the coordinate data from the storage unit and executes a focus control process to control a focusing action of the imaging optical system with respect to a subject indicated by the coordinate data read from the storage unit;

a still image storage unit that executes a storage process to store an image signal obtained from the imaging element in a memory as a still image; and an operating member that instructs, so that the focus control unit reads the coordinate data from the storage unit and executes the focus control process in response to a first actuation of the operating member, and the still image storage unit executes the storage process in response to a second actuation of the operating member, wherein the coordinate data which is read by the focus control unit from the storage unit in response to the first actuation of the operating member is stored in the storage unit before the first actuation of the operating member, and the imaging optical system is controlled to be in focus with respect to the coordinate data of the subject which is read by the focus control unit.

2. The imaging apparatus according to claim 1, wherein the focus control unit reads the most recent coordinate data stored before the first actuation of the operating member.

3. The imaging apparatus according to claim 2, wherein if a time difference between generation of an image signal from which the latest coordinate data of the face region is obtained and the first actuation of the operating member is equal to or greater than a predetermined time, the focus control unit controls the imaging optical system to be in focus by using coordinate data of a face region newly detected by the face region detecting unit after the first actuation of the operating member.

4. The imaging apparatus according to claim 1, wherein the face region detecting unit changes a detection interval at which the face region is detected depending on whether the first actuation has occurred.

5. The imaging apparatus according to claim 4, wherein the face region detecting unit detects the face region at a shorter interval after the first actuation compared to before the first actuation.

6. The imaging apparatus according to claim 1, wherein the focus control unit compares the coordinate data obtained for each of a plurality of image signals generated at different timings, and if the difference in the coordinate data obtained is within a predetermined range, the focus control unit does not change a focusing position.

7. The imaging apparatus according to claim 1, wherein the storage unit stores information on a size of the face region and information indicating reliability of a detection result of the face region.

8. The imaging apparatus according to claim 1, further comprising, an image correcting unit that performs image correction on an image signal of a still image captured in accordance with the second actuation of the operating member, by reading the most recent coordinate data, which is stored in the storage unit before the second actuation of the operating member.

9. A control method for an imaging apparatus, the control method comprising:

photoelectrically converting a photographic subject image formed by an imaging optical system;

repetitively detecting a face region based on a signal obtained from the photoelectric conversion applied to the photographic subject image;

storing, in a storage unit, coordinate data of the detected photographic face region;

reading the coordinate data from the storage unit;

controlling a focusing action of the imaging optical system with respect to a subject indicated by the coordinate data;

storing an image signal obtained from the converting step in a memory as a still image; and instructing, by an operating member, so that the step of reading the coordinate data from the storage unit and the step of controlling the focusing action are executed in response to a first actuation of the operating member, and the step of storing the image signal is executed in response to a second actuation of the operating member, wherein the coordinate data which is read from the storage unit in response to the first actuation of the operating member is stored in the storage unit before the first actuation of the operating member, and the imaging optical system is controlled to be in focus with respect to the coordinate data of the subject which is read.

10. An imaging apparatus comprising:

an imaging element that photoelectrically converts a photographic subject image formed by an imaging optical system;

a face region detecting unit that repetitively detects a face region based on an image signal obtained from the imaging element;

a storage unit that stores coordinate data of the face region detected by the face region detecting unit;

an exposure control unit that reads the coordinate data from the storage unit and controls the exposure and adjusts brightness of the image signal with respect to a subject indicated by the coordinate data read from the storage unit;

a still image storage unit that executes a storage process to store the image signal obtained from the imaging element in a memory as a still image; and an operating member that instructs, so that the exposure control unit reads the coordinate data from the storage unit and executes the exposure control process in response to a first actuation of the operating member, and the still image storage unit executes the storage process in response to a second actuation of the operating member, wherein the coordinate data which is read by the exposure control unit from the storage unit in response to the first actuation of the operating member is stored in the storage unit before the first actuation of the operating member, and the exposure control unit adjusts the brightness with respect to the subject indicated by the coordinate data which is read by the exposure control unit.

11. The imaging apparatus according to claim 10, wherein the exposure control unit reads the most recent coordinate data stored before the first actuation of the operating member.

12. A control method for an imaging apparatus, the control method comprising:

converting a photographic subject image formed by an imaging optical system;

repetitively detecting a face region based on an image signal obtained from the imaging element;

storing, in a storage unit, coordinate data of the detected face region;

reading the coordinate data from the storage unit;
controlling the exposure and adjusting brightness of the image signal with respect to a subject indicated by the coordinate data;
storing the image signal obtained from the converting step in a memory as a still image; and
instructing, by an operating member, so that the step of reading the coordinate data from the storage unit and the step of controlling the exposure are executed in response to a first actuation of the operating member, and the step of storing the image signal is executed in response to a second actuation of the operating member,
wherein the coordinate data which is read from the storage unit in response to the first actuation of the operating member is stored in the storage unit before the first actuation of the operating member, and the imaging optical system is controlled to be in focus with respect to the coordinate data of the subject which is read.

* * * * *